(12) United States Patent
Fang et al.

(10) Patent No.: US 11,276,243 B2
(45) Date of Patent: Mar. 15, 2022

(54) TRAFFIC SIMULATION METHOD, DEVICE AND STORAGE MEDIUM

(71) Applicant: Baidu Online Network Technology (Beijing) Co., Ltd, Beijing (CN)

(72) Inventors: Jin Fang, Beijing (CN); Feilong Yan, Beijing (CN); Ruigang Yang, Beijing (CN); Liang Wang, Beijing (CN); Yu Ma, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/514,109

(22) Filed: Jul. 17, 2019

(65) Prior Publication Data
US 2020/0082640 A1    Mar. 12, 2020

(30) Foreign Application Priority Data
Sep. 7, 2018    (CN) .......................... 201811045708.3

(51) Int. Cl.
| | |
|---|---|
| *G06T 19/20* | (2011.01) |
| *G06T 7/11* | (2017.01) |
| *G06T 7/55* | (2017.01) |
| *G06T 7/70* | (2017.01) |
| *G06K 9/00* | (2006.01) |

(52) U.S. Cl.
CPC .......... *G06T 19/20* (2013.01); *G06K 9/00805* (2013.01); *G06T 7/11* (2017.01); *G06T 7/55* (2017.01); *G06T 7/70* (2017.01); *G06T 2207/10028* (2013.01); *G06T 2219/2016* (2013.01)

(58) Field of Classification Search
None
See application file for complete search history.

(56) References Cited

U.S. PATENT DOCUMENTS

| | | | | |
|---|---|---|---|---|
| 5,633,946 | A | * 5/1997 | Lachinski | G01C 15/00 348/118 |
| 2005/0137756 | A1 | 6/2005 | Takahashi | |

(Continued)

FOREIGN PATENT DOCUMENTS

| | | |
|---|---|---|
| CN | 102663196 A | 9/2012 |
| CN | 103258338 A | 8/2013 |

(Continued)

OTHER PUBLICATIONS

Extended European Search Report dated Jan. 2, 2020 for European Application No. 19185787.9.

(Continued)

*Primary Examiner* — Michael J Cobb
(74) *Attorney, Agent, or Firm* — Akerman LLP

(57) ABSTRACT

A simulation data augmentation method, a simulation data augmentation device and a simulation data augmentation terminal are provided according to embodiments of the present application. The method includes: acquiring a point cloud based on a plurality of frames, wherein the point cloud includes a plurality of obstacles labeled with real labeling data; dividing the point cloud into a plurality of preset regions, wherein each of the preset regions includes at least one obstacle; and adjusting the obstacle based on the real labeling data of the obstacle in the preset regions to obtain simulation data.

7 Claims, 2 Drawing Sheets

(56) References Cited

U.S. PATENT DOCUMENTS

| | | | |
|---|---|---|---|
| 2008/0243378 A1* | 10/2008 | Zavoli | G01C 21/28 701/533 |
| 2010/0106356 A1 | 4/2010 | Trepagnier et al. | |
| 2011/0282581 A1 | 11/2011 | Zeng | |
| 2012/0053755 A1* | 3/2012 | Takagi | B60W 40/04 701/1 |
| 2012/0281907 A1* | 11/2012 | Samples | G06K 9/00201 382/159 |
| 2014/0003671 A1 | 1/2014 | Matsubara | |
| 2014/0032012 A1 | 1/2014 | Joshi et al. | |
| 2017/0025001 A1 | 1/2017 | Gignac et al. | |
| 2017/0025012 A1 | 1/2017 | Thompson et al. | |
| 2017/0025015 A1 | 1/2017 | Thompson et al. | |
| 2017/0092000 A1 | 3/2017 | Schwimmer | |
| 2017/0120902 A1* | 5/2017 | Kentley | B60W 10/04 |
| 2018/0005056 A1 | 1/2018 | Matsubara | |
| 2018/0075666 A1* | 3/2018 | Feng | G06K 9/00711 |
| 2018/0157920 A1* | 6/2018 | Hu | B60R 1/00 |
| 2019/0152488 A1* | 5/2019 | Kotteri | B60W 30/143 |
| 2019/0265040 A1* | 8/2019 | Takano | G01C 21/3602 |
| 2021/0065553 A1* | 3/2021 | Tsushima | G08G 1/166 |

FOREIGN PATENT DOCUMENTS

| | | | |
|---|---|---|---|
| CN | 103443838 A | | 12/2013 |
| CN | 104020674 A | | 9/2014 |
| CN | 104183014 A | | 12/2014 |
| CN | 104252716 A | | 12/2014 |
| CN | 104950883 A | | 9/2015 |
| CN | 105761308 A | | 7/2016 |
| CN | 105844600 A | | 8/2016 |
| CN | 105957145 A | | 9/2016 |
| CN | 106683464 A | | 5/2017 |
| CN | 104931977 B | | 8/2017 |
| CN | 107678306 A | | 2/2018 |
| CN | 107818293 A | | 3/2018 |
| CN | 107871129 A | | 4/2018 |
| CN | 107993512 A | | 5/2018 |
| CN | 108268518 A | * | 7/2018 |
| CN | 108492356 A | | 9/2018 |
| DE | 112012001506 T5 | | 1/2014 |
| EP | 3121802 A1 | | 1/2017 |
| JP | 2005202922 A | | 7/2005 |
| JP | 2006113645 A | | 4/2006 |
| JP | 2007117260 A | | 5/2007 |
| JP | 2012203806 A | | 10/2012 |
| JP | 2014025925 A | | 2/2014 |
| JP | 2014052861 A | | 3/2014 |
| JP | 2017113306 A | | 6/2017 |
| JP | 2018060511 A | | 4/2018 |
| JP | 2018060512 A | | 4/2018 |
| TW | 200942545 A | | 10/2009 |
| TW | 200945245 A | | 11/2009 |
| TW | 201643063 A | | 12/2016 |
| WO | 2012/133457 A1 | | 10/2012 |
| WO | 2017/203710 A1 | | 11/2017 |

OTHER PUBLICATIONS

Raymond A. Yeh et al., "Semantic Image Inpainting with Deep Generative Models", Nov. 14, 2016, pp. 6882-6890.

Alireza Asvadi et al., "DepthCN: Vehicle detection using 3D-LIDAR and ConvNet", 2017 IEEE 20th International Conference on Intelligent Transportation Systems (ITSC), IEEE, Oct. 16, 2019, pp. 1-6.

Agnieszka Mikolajczyk et al., "Data augmentation for improving deep learning in image classification problem", 2018 International Interdisciplinary PHD Workshop (IIPHDW), IEEE, May 9, 2018, pp. 117-122.

Notification of the First Office Action dated Aug. 21, 2019 for Chinese Application No. 201811045664.4.

Search Report dated Aug. 3, 2019 for Chinese Application No. 201811045664.4.

Search Report dated Aug. 1, 2019 for Chinese Application No. 201811045708.3.

Search Report dated Oct. 10, 2019 for Chinese Application No. 201811045708.3.

First Office Action dated Aug. 12, 2019 for Chinese Application No. 201811045708.3.

The Second Office Action dated Oct. 18, 2019 for Chinese Application No. 201811045708.3.

Search Report dated Feb. 13, 2020 issued in connection with corresponding Chinese Patent Application No. 2018110456644.

Extended European Search Report dated Jan. 31, 2020 issued in connection with corresponding European Patent Application No. 19185795.2.

Notice of Reasons for Refusal dated Sep. 8, 2020 issued in connection with corresponding Japanese Patent Application No. 2019-133290.

Notice of Reasons for Refusal dated Mar. 31, 2021 issued in connection with corresponding Japanese Patent Application No. 2019-133290.

Notice of Reasons for Refusal dated Jan. 5, 2022 issued in connection with corresponding Japanese Patent Application No. 2019-133290.

* cited by examiner

TRAFFIC SIMULATION METHOD, DEVICE AND STORAGE MEDIUM

CROSS-REFERENCE TO RELATED APPLICATION

This application claims priority to Chinese Patent Application No. 201811045708.3, filed on Sep. 7, 2018, which is hereby incorporated by reference in its entirety.

FIELD OF THE DISCLOSURE

The present disclosure relates to the technical field of computers, and in particular to a simulation data augmentation method, a simulation data augmentation device and a computer readable storage medium.

BACKGROUND OF THE DISCLOSURE

In traffic simulation, the position of an obstacle having labeling data is extracted to serve as an arrangement position. Since the amount of the labeling data is limited, the amount of obtained simulation data is limited, and a requirement for diversity of the simulation data cannot be met. At present, the simulation data are typically augmented by zooming or rotating a frame image, so as to obtain more simulation data. However, contents modified in this way of simulation data augmentation are not many, and thus it is still impossible to generate a lot of simulation data.

SUMMARY OF THE DISCLOSURE

According to embodiments of the present disclosure, a simulation data augmentation method, a simulation data augmentation device and a simulation data augmentation terminal are provided, to solve at least the above technical problems in the existing technologies.

In a first aspect, according to an embodiment of the present disclosure, a simulation data augmentation method is provided, the method includes:

acquiring a point cloud based on a plurality of frames, wherein the point cloud includes a plurality of obstacles labeled with real labeling data;

dividing the point cloud into a plurality of preset regions, wherein each of the preset regions includes at least one obstacle; and adjusting the obstacle based on the real labeling data of the obstacle in the preset region to obtain simulation data.

In combination with the first aspect, in a first implementation of the first aspect of the embodiment of the present disclosure, the adjusting the obstacle based on the real labeling data of the obstacle to obtain simulation data includes:

extracting position data from the real labeling data of the obstacle, and adjusting the position data of the obstacle; and using the adjusted position data as the simulation data.

In combination with the first aspect, in a second implementation of the first aspect of the embodiment of the present disclosure, the adjusting the obstacle based on the real labeling data of the obstacle to obtain simulation data includes:

extracting position data from the real labeling data of the obstacle, and replacing a type of the obstacle according to the position data; and using the replaced type as the simulation data.

In combination with the first aspect, in a third implementation of the first aspect of the embodiment of the present disclosure, the adjusting the obstacle based on the real labeling data of the obstacle to obtain simulation data includes:

extracting position data from the real labeling data of adjacent obstacles, and calculating a space between the adjacent obstacles; and adding a new obstacle in the space between the adjacent obstacles, and acquiring real labeling data of the new obstacle as the simulation data.

In combination with the first aspect, in a fourth implementation of the first aspect of the embodiment of the present disclosure, the adjusting the obstacle based on the real labeling data of the obstacle to obtain simulation data includes:

extracting an obstacle type from the real labeling data of the obstacle, and adjusting an orientation of the obstacle according to the obstacle type; and using the adjusted orientation of the obstacle as the simulation data.

In a second aspect, according to an embodiment of the present disclosure, a simulation data augmentation device is provided, the device includes:

a point cloud acquiring module, configured to acquire a point cloud based on a plurality of frames, wherein the point cloud includes a plurality of obstacles labeled with real labeling data;

a region-division module, configured to divide the point cloud into a plurality of preset regions, wherein each of the preset regions includes at least one obstacle; and a simulation data increasing module, configured to adjust the obstacle based on the real labeling data of the obstacle in the preset region to obtain simulation data.

In combination with the second aspect, in a first implementation of the second aspect of the embodiment of the present disclosure, the simulation data increasing module includes:

a position data increasing unit, configured to extract position data from the real labeling data of the obstacle, adjust the position data of the obstacle, and use the adjusted position data as the simulation data.

In combination with the second aspect, in a second implementation of the second aspect of the embodiment of the present disclosure, the simulation data increasing module further includes:

a type increasing unit, configured to extract position data from the real labeling data of the obstacle, replace a type of the obstacle according to the position data, and use the replaced type as the simulation data.

In combination with the second aspect, in a third implementation of the second aspect of the embodiment of the present disclosure, the simulation data increasing module further includes:

a labeling data increasing unit, configured to extract position data from the real labeling data of adjacent obstacles, calculate a space between the adjacent obstacles, add a new obstacle in the space between the adjacent obstacles, and acquire real labeling data of the new obstacle as the simulation data.

In combination with the second aspect, in a third implementation of the second aspect of the embodiment of the present disclosure, the simulation data increasing module further includes:

an orientation data increasing unit, configured to extract an obstacle type from the real labeling data of the obstacle, adjust an orientation of the obstacle according to the obstacle type, and use the adjusted orientation of the obstacle as the simulation data.

In a third aspect, according to an embodiment of the present disclosure, a simulation data augmentation terminal is provided, the terminal includes: a processor and a memory for storing a program which supports the simulation data augmentation device in executing the simulation data augmentation method described above in the first aspect, and the processor is configured to execute the program stored in the memory. The terminal can further include a communication interface for enabling the terminal to communicate with other devices or communication networks.

The functions may be implemented by using hardware or by executing corresponding software by hardware. The hardware or software includes one or more modules corresponding to the functions described above.

In a fourth aspect, according to an embodiment of the present disclosure, a computer readable storage medium is provided for storing computer software instructions for use by a simulation data augmentation device, the computer readable storage medium including a program involved in executing the simulation data augmentation method described above in the first aspect by the simulation data augmentation device.

One of the above technical solutions has the following advantages or advantageous effects: by performing region-division on the obtained point cloud, each of the preset regions includes at least one obstacle, and then by adjusting the obstacle according to the real labeling data of the obstacle, simulation data is obtained. There are many ways of the adjustment, including: performing adding or deleting operation on the obstacle for different scenarios and requirements, where data obtained after performing adding or deleting operation on the obstacle are the simulation data; or changing a position, an orientation, an identity recognition number and a type of the obstacle, where the real labeling data corresponding to a new obstacle obtained after changing are the simulation data. In this way, the amount of the simulation data is increased, and the diversity of the simulation data is improved.

The above summary is provided only for illustration, and is not intended to limit the present disclosure in any way. In addition to the illustrative aspects, embodiments and features described above, further aspects, embodiments and features of the present disclosure may be readily understood from the following detailed description with reference to the accompanying drawings.

BRIEF DESCRIPTION OF THE DRAWINGS

Unless otherwise specified, identical or similar parts or elements are denoted by identical reference signs throughout several figures of the accompanying drawings. The drawings are not necessarily drawn to scale. It should be understood that these drawings merely illustrate some embodiments of the present disclosure, and should not be construed as limiting the scope of the disclosure.

DETAILED DESCRIPTION OF THE EMBODIMENT(S) OF THE DISCLOSURE

Hereinafter, only some exemplary embodiments are simply described. As can be appreciated by those skilled in the art, the described embodiments may be modified in various different ways without departing from the spirit or scope of the present disclosure. Accordingly, the drawings and the description should be considered as illustrative in nature instead of being restrictive.

First Embodiment

Figure 1:
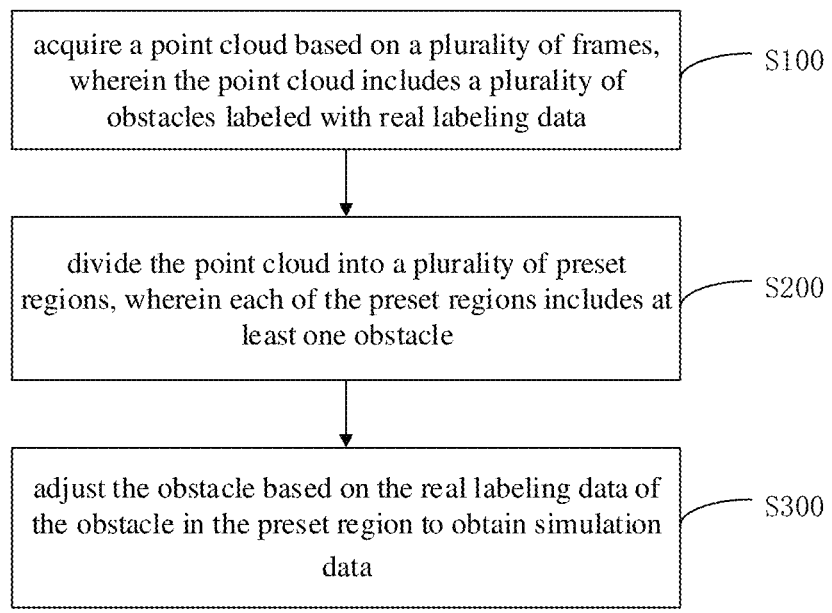
FIG. 1 is a schematic diagram of a simulation data augmentation method according to an embodiment of the present disclosure.

As shown in FIG. 1, a simulation data augmentation method is provided according to a specific embodiment of the present disclosure. The method includes steps S100 to S300.

At Step S100, a point cloud based on a plurality of frames is acquired, wherein the point cloud includes a plurality of obstacles labeled with real labeling data.

When an acquisition vehicle moves along a movement route, the acquisition vehicle may obtain a point cloud based on a plurality of frames, by scanning the surrounding obstacles using radar. The acquisition vehicle may move along a main road or along a specified side road, and various movement of the acquisition vehicle will fall within the protection scope of the embodiment of the present disclosure. Alternatively, the point cloud based on a plurality of frames may be directly acquired from outside.

In each frame of the point cloud, a point cloud coordinate system is established by taking the acquisition vehicle as an origin, and the obstacles have relative coordinates with respect to the acquisition vehicle. Absolute coordinates of the obstacles are obtained based on absolute coordinates of the acquisition vehicle and the relative coordinates of the obstacles. The obstacles are labeled based on the absolute coordinates of the obstacles to obtain real labeling data of the obstacles, thereby obtaining real labeling data of the simulation obstacles.

At Step S200, the point cloud is divided into a plurality of preset regions, wherein each of the preset regions includes at least one obstacle.

The point cloud includes a plurality of preset regions, and each preset region includes at least one obstacle, with the purpose of dividing an adjustable activity range of the obstacles, thereby facilitating subsequent adjustment of the obstacles and further obtaining simulation data. The size of the preset region may be adjusted based on the size of the obstacle, which falls within the protection scope of the embodiment of the present disclosure.

At Step S300, the obstacle is adjusted based on the real labeling data of the obstacle in the preset region to obtain simulation data.

Adjusting the obstacle based on the real labeling data of the obstacle may include: performing adding or deleting operation on the obstacle for different scenarios and requirements, where data obtained by performing adding or deleting operation on the obstacle are the simulation data; or changing a position, an orientation, an identity recognition number and a type of the obstacle, where the labeling data of the new obstacle obtained by the changing are the simulation data. In this way, the amount of the simulation data is increased, and the diversity of the simulation data is improved.

In an embodiment, adjusting the obstacle based on the real labeling data of the obstacle to obtain simulation data includes:

extracting position data from the real labeling data of the obstacle, adjusting the position data of the obstacle, and using the adjusted position data as the simulation data.

The position of the obstacle is changed in the preset region to obtain multiple data position data of the obstacle, and the obtained new position data are used as the simulation data. The position of the obstacle is changed in the preset region, thereby avoiding collision with other obstacles in another region.

In an embodiment, the adjusting the obstacle based on the real labeling data of the obstacle to obtain simulation data includes:

extracting position data from the real labeling data of the obstacle, replacing a type of the obstacle according to the position data, and using the replaced type as the simulation data.

The position of the obstacle is determined firstly, and then the type of the obstacle is replaced based on the position where the obstacle is located in combination with the scenario. In an example, in a side road scenario, an obstacle of an automobile type is replaced with an obstacle of a bicycle type, and the bicycle type after replacement is used as the simulation data.

In an embodiment, the adjusting the obstacle based on the real labeling data of the obstacle to obtain simulation data includes:

extracting position data from the real labeling data of adjacent obstacles, and calculating a space between the adjacent obstacles; and adding a new obstacle in the space between the adjacent obstacles, and acquiring real labeling data of the new obstacle as the simulation data.

A spatial distance between two adjacent obstacles is calculated based on position data of the two adjacent obstacles, and a new obstacle is added in the spatial distance. The type of the added obstacle may be selected based on the size of the space so as to avoid collision of the new obstacle with the two adjacent obstacles. Labeling data corresponding to the new obstacle are used as the simulation data.

In an embodiment, the adjusting the obstacle based on the real labeling data of the obstacle to obtain simulation data includes:

extracting an obstacle type from the real labeling data of the obstacle, adjusting an orientation of the obstacle according to the obstacle type, and using the adjusted orientation of the obstacle as the simulation data.

The orientation of the obstacle is changed based on the type of the obstacle and the scenario. For example, a rotational angle of an obstacle of an automobile type should not exceed a threshold; otherwise, the traffic regulation is violated. The adjusted orientation of the obstacle is used as the simulation data.

Second Embodiment

Figure 2:
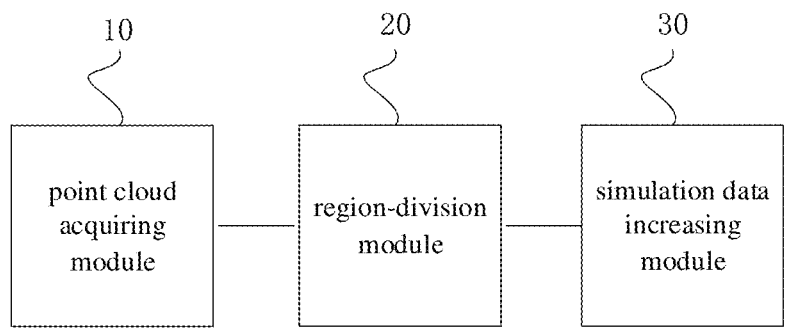
FIG. 2 is a schematic diagram of a simulation data augmentation device according to an embodiment of the present disclosure.

As shown in FIG. 2, a simulation data augmentation device is provided according to another specific embodiment of the present disclosure, the device includes:

a point cloud acquiring module 10, configured to acquire a point cloud based on a plurality of frames, wherein the point cloud includes a plurality of obstacles labeled with real labeling data;

a region-division module 20, configured to divide the point cloud into a plurality of preset regions, wherein each of the preset regions includes at least one obstacle; and a simulation data increasing module 30, configured to adjust the obstacle based on the real labeling data of the obstacle in the preset region to obtain simulation data.

In an embodiment, the simulation data increasing module 30 includes:

a position data increasing unit, configured to extract position data from the real labeling data of the obstacle, adjust the position data of the obstacle, and use the adjusted position data as the simulation data.

In an embodiment, the simulation data increasing module 30 further includes:

a type increasing unit, configured to extract position data from the real labeling data of the obstacle, replace a type of the obstacle according to the position data, and use the replaced type as the simulation data.

In an embodiment, the simulation data increasing module 30 further includes:

a labeling data increasing unit, configured to extract position data from the real labeling data of adjacent obstacles, calculate a space between the adjacent obstacles, add a new obstacle in the space between the adjacent obstacles, and acquire real labeling data of the new obstacle as the simulation data.

In an embodiment, the simulation data increasing module 30 further includes:

an orientation data increasing unit, configured to extract an obstacle type from the real labeling data of the obstacle, adjust an orientation of the obstacle according to the obstacle type, and use the adjusted orientation of the obstacle as the simulation data.

Third Embodiment

Figure 3:
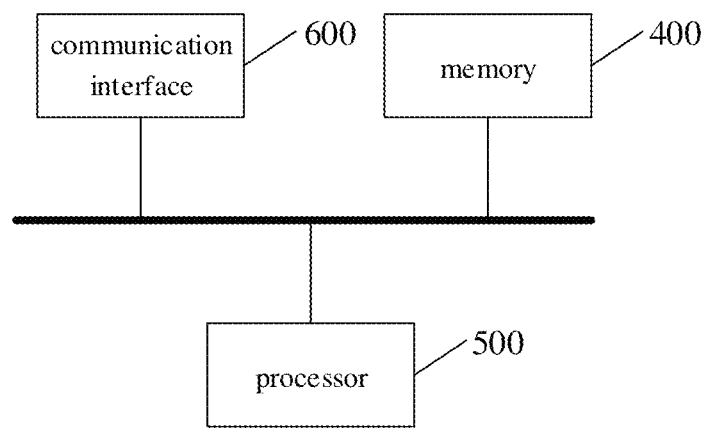
FIG. 3 is a schematic diagram of a simulation data augmentation terminal according to an embodiment of the present disclosure.

As shown in FIG. 3, a simulation data augmentation terminal is provided according to an embodiment of the present disclosure, which includes:

a memory 400 and a processor 500, wherein a computer program that can run on the processor 500 is stored in the memory 400; when the processor 500 executes the computer program, the simulation data augmentation method according to the above embodiment is implemented; the number of the memory 400 and the processor 500 may each be one or more; and a communication interface 600, configured to enable the memory 400 and the processor 500 to communicate with an external device.

The memory 400 may include a high-speed RAM memory, or may also include a non-volatile memory, such as at least one disk memory.

If the memory 400, the processor 500 and the communication interface 600 are implemented independently, the memory 400, the processor 500 and the communication interface 600 may be connected to each other via a bus so as to realize mutual communication. The bus may be an industry standard architecture (ISA) bus, a peripheral component interconnect (PCI) bus, an extended industry standard architecture (EISA) bus, or the like. The bus may be categorized into an address bus, a data bus, a control bus or the like. For ease of illustration, only one bold line is shown in FIG. 3 to represent the bus, but it does not mean that there is only one bus or only one type of bus.

Optionally, in a specific implementation, if the memory 400, the processor 500 and the communication interface 600 are integrated on one chip, then the memory 400, the processor 500 and the communication interface 600 can complete mutual communication through an internal interface.

Fourth Embodiment

An embodiment of the present disclosure provides a computer readable storage medium having a computer program stored thereon which, when executed by a processor, implements the simulation data augmentation method described in any of the above embodiments.

In the present specification, the description referring to the terms "one embodiment", "some embodiments", "an example", "a specific example", or "some examples" or the like means that the specific features, structures, materials, or characteristics described in connection with the embodiment or example are contained in at least one embodiment or example of the present disclosure. Moreover, the specific features, structures, materials, or characteristics described may be combined in a suitable manner in any one or more of the embodiments or examples. In addition, various embodiments or examples described in the specification as well as features of different embodiments or examples may be united and combined by those skilled in the art, as long as they do not contradict with each other.

Furthermore, terms "first" and "second" are used for descriptive purposes only, and are not to be construed as indicating or implying relative importance or implicitly indicating the number of recited technical features. Thus, a feature defined with "first" and "second" may include at least one said feature, either explicitly or implicitly. In the description of the present disclosure, the meaning of "a plurality" is two or more than two, unless otherwise explicitly or specifically indicated.

Any process or method described in the flowcharts or described otherwise herein may be construed as representing a module, segment or portion including codes for executing one or more executable instructions for implementing particular logical functions or process steps. The scope of the preferred embodiments of the present disclosure includes additional implementations in which functions may be implemented in an order that is not shown or discussed, including in a substantially concurrent manner or in a reverse order based on the functions involved. All these should be understood by those skilled in the art to which the embodiments of the present disclosure belong.

The logics and/or steps represented in the flowcharts or otherwise described herein for example may be considered as an ordered list of executable instructions for implementing logical functions. They can be specifically embodied in any computer readable medium for use by an instruction execution system, apparatus or device (e.g., a computer-based system, a system including a processor, or another system that can obtain instructions from the instruction execution system, apparatus or device and execute these instructions) or for use in conjunction with the instruction execution system, apparatus or device. For the purposes of the present specification, "computer readable medium" can be any means that can contain, store, communicate, propagate or transmit programs for use by an instruction execution system, apparatus or device or for use in conjunction with the instruction execution system, apparatus or device. More specific examples (non-exhaustive list) of computer readable storage medium at least include: electrical connection parts (electronic devices) having one or more wires, portable computer disk cartridges (magnetic devices), random access memory (RAM), read only memory (ROM), erasable programmable read-only memory (EPROM or flash memory), fiber optic devices, and portable read only memory (CDROM). In addition, the computer-readable storage medium may even be a paper or other suitable medium on which the programs can be printed. This is because for example the paper or other medium can be optically scanned, followed by editing, interpretation or, if necessary, other suitable ways of processing so as to obtain the programs electronically, which are then stored in a computer memory.

It should be understood that individual portions of the present disclosure may be implemented in the form of hardware, software, firmware, or a combination thereof. In the above embodiments, a plurality of steps or methods may be implemented using software or firmware stored in a memory and executed by a suitable instruction execution system. For example, if they are implemented in hardware, as in another embodiment, any one or a combination of the following techniques known in the art may be used: discrete logic circuits having logic gate circuits for implementing logic functions on data signals, application-specific integrated circuits having suitable combined logic gate circuits, programmable gate arrays (PGA), field programmable gate arrays (FPGA), etc.

Those skilled in the art may understand that all or part of the steps carried in the method of the foregoing embodiments may be implemented by using a program to instruct the relevant hardware, and the program may be stored in a computer readable storage medium. When executed, the program includes one or a combination of the steps in the method embodiments.

In addition, individual functional units in various embodiments of the present disclosure may be integrated in one processing module, or individual units may also exist physically and independently, or two or more units may also be integrated in one module. The above integrated module can be implemented in the form of hardware or in the form of a software functional module. The integrated module may also be stored in a computer readable storage medium if it is implemented in the form of a software function module and sold or used as a stand-alone product. The storage medium may be a read-only memory, a magnetic disk or an optical disk, etc.

The above description only relates to specific embodiments of the present disclosure, but the scope of protection of the present disclosure is not limited thereto, and any of those skilled in the art can readily contemplate various changes or replacements within the technical scope of the present disclosure. All these changes or replacements should be covered by the scope of protection of the present disclosure. Therefore, the scope of protection of the present disclosure should be determined by the scope of the appended claims.

What is claimed is:

1. A traffic simulation method, the method comprising:
   acquiring a point cloud based on a plurality of frames, wherein the point cloud comprises a plurality of obstacles labeled with real labeling data, and the real labeling data of the obstacle comprises position data and an obstacle type, wherein the position data comprises absolute coordinates of the obstacle, wherein the absolute coordinates of the obstacle are based on relative coordinates of the obstacle with respect to absolute coordinates of an acquisition vehicle;
   dividing the point cloud into a plurality of regions, wherein each of the regions comprises at least one obstacle;
   creating additional traffic simulation data by adjusting the real labeling data of the obstacle in the region and using the adjusted real labeling data of the obstacle; and
   at least one of:

(i) wherein the creating the additional traffic simulation data by adjusting the real labeling data of the obstacle and using the adjusted real labeling data of the obstacle comprises:
(a) extracting the position data from the real labeling data of the obstacle, and replacing the obstacle type according to the position data; and
(b) creating the additional traffic simulation data using the replaced obstacle type; or
(ii) wherein the method further comprises:
(a) extracting the position data from the real labeling data of adjacent obstacles, and calculating a space between the adjacent obstacles; and
(b) creating the additional traffic simulation data by adding a new obstacle in the space between the adjacent obstacles, and acquiring real labeling data of the new obstacle.

2. The traffic simulation method of claim 1, wherein the creating the additional traffic simulation data by adjusting the real labeling data of the obstacle and using the adjusted real labeling data of the obstacle comprises:
extracting the position data from the real labeling data of the obstacle, and adjusting the position data of the obstacle; and
creating the additional traffic simulation data using the adjusted position data.

3. The traffic simulation method of claim 1, wherein the creating the additional traffic simulation data by adjusting the real labeling data of the obstacle and using the adjusted real labeling data of the obstacle comprises:
extracting the obstacle type from the real labeling data of the obstacle, and adjusting an orientation of the obstacle according to the obstacle type; and
creating the additional traffic simulation data using the adjusted orientation of the obstacle.

4. A traffic simulation device, the device comprising:
one or more processors; and
a storage device configured to store one or more programs, that, when executed by the one or more processors, cause the one or more processors to:
acquire a point cloud based on a plurality of frames, wherein the point cloud comprises a plurality of obstacles labeled with real labeling data, and the real labeling data of the obstacle comprises position data and an obstacle type, wherein the position data comprises absolute coordinates of the obstacle, wherein the absolute coordinates of the obstacle are based on relative coordinates of the obstacle with respect to absolute coordinates of an acquisition vehicle;
divide the point cloud into a plurality of regions, wherein each of the regions comprises at least one obstacle; and
create additional traffic simulation data by adjusting the obstacle based on the real labeling data of the obstacle in the region and using the adjusted real labeling data of the obstacle; and
at least one of:
(i) wherein the one or more programs, when executed by the one or more processors, cause the one or more processors further to:
(a) extract the position data from the real labeling data of the obstacle; and
(b) create the additional traffic simulation data by replacing the obstacle type according to the position data, and using the replaced obstacle type; or
(ii) wherein the one or more programs, when executed by the one or more processors, cause the one or more processors further to:
(a) extract the position data from the real labeling data of adjacent obstacles;
(b) calculate a space between the adjacent obstacles; and
(c) create the additional traffic simulation data by adding a new obstacle in the space between the adjacent obstacles, and acquiring real labeling data of the new obstacle.

5. The traffic simulation device of claim 4, wherein the one or more programs, when executed by the one or more processors, cause the one or more processors further to:
extract the position data from the real labeling data of the obstacle; and
create the additional traffic simulation data by adjusting the position data of the obstacle, and using the adjusted position data.

6. The traffic simulation device of claim 4, wherein the one or more programs, when executed by the one or more processors, cause the one or more processors further to:
extract the obstacle type from the real labeling data of the obstacle; and
create the additional traffic simulation data by adjusting an orientation of the obstacle according to the obstacle type, and using the adjusted orientation of the obstacle.

7. A non-transitory computer readable storage medium, in which a computer program is stored, wherein the program, when executed by a processor, causes the processor to perform operations of:
acquiring a point cloud based on a plurality of frames, wherein the point cloud comprises a plurality of obstacles labeled with real labeling data, and the real labeling data of the obstacle comprises position data and an obstacle type, wherein the position data comprises absolute coordinates of the obstacle, wherein the absolute coordinates of the obstacle are based on relative coordinates of the obstacle with respect to absolute coordinates of an acquisition vehicle;
dividing the point cloud into a plurality of regions, wherein each of the regions comprises at least one obstacle;
creating additional traffic simulation data by adjusting the real labeling data of the obstacle in the region and using the adjusted real labeling data of the obstacle; and
at least one of:
(i) wherein the creating the additional traffic simulation data by adjusting the real labeling data of the obstacle and using the adjusted real labeling data of the obstacle comprises:
(a) extracting the position data from the real labeling data of the obstacle, and replacing the obstacle type according to the position data; and
(b) creating the additional traffic simulation data using the replaced obstacle type; or
(ii) wherein the method further comprises:
(a) extracting the position data from the real labeling data of adjacent obstacles, and calculating a space between the adjacent obstacles; and
(b) creating the additional traffic simulation data by adding a new obstacle in the space between the adjacent obstacles, and acquiring real labeling data of the new obstacle.

\* \* \* \* \*